United States Patent Office 3,605,301
Patented Sept. 20, 1971

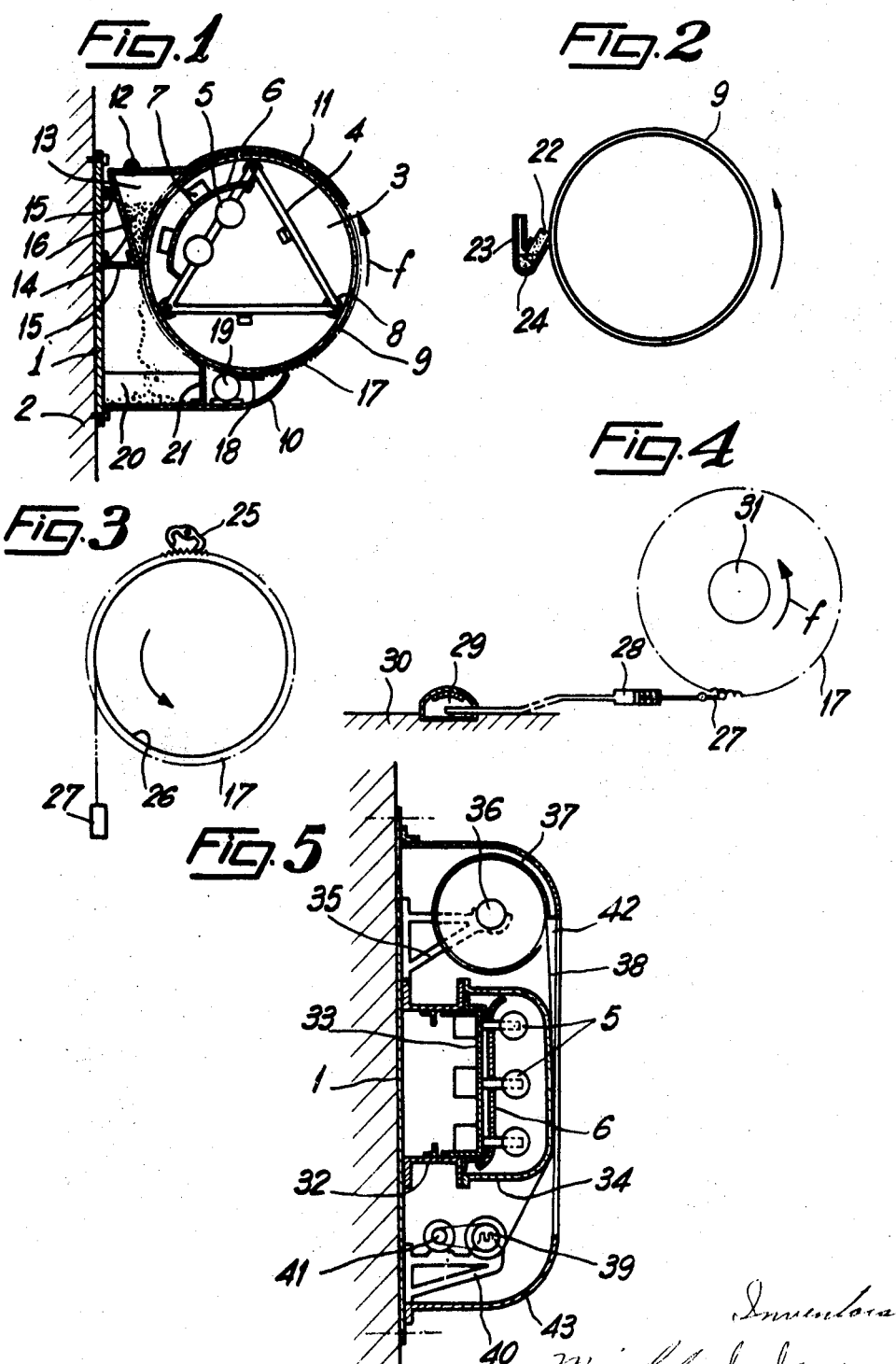

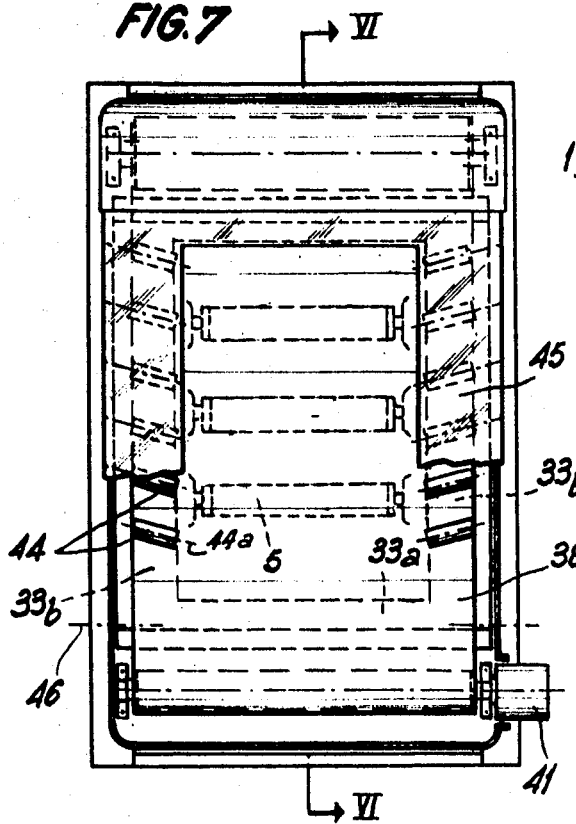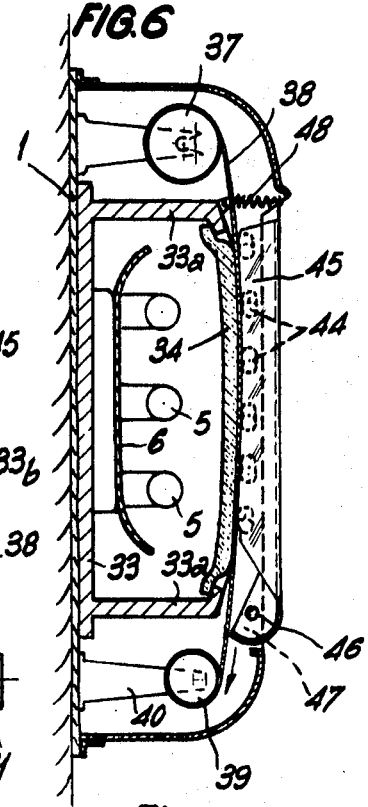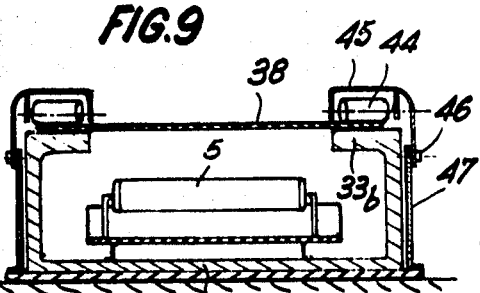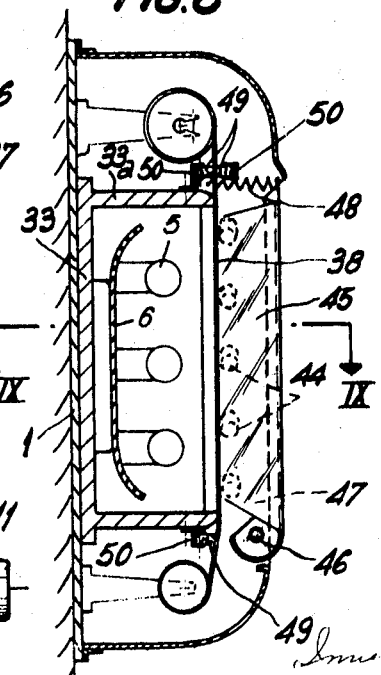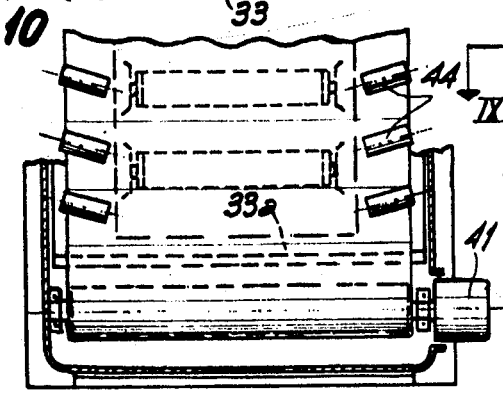

3,605,301
LIGHTING DEVICE
Michel J. Jacquot, Beynes, and Charles G. Amicel, Carrieres-sur-Seine, France, assignors to Bertin et Cie, Plaisir, Yvelines, France
Filed Nov. 5, 1968, Ser. No. 773,388
Claims priority, application France, Nov. 6, 1967, 127,040; Oct. 4, 1968, 168,773
Int. Cl. G09f *11/12*
U.S. Cl. 40—31        1 Claim

ABSTRACT OF THE DISCLOSURE

The invention comprehends a lighting device having a light source means, one or more light transmitting layers in front of the light source means which is positioned to transmit light through a zone of the layer or layers, and means for continuously changing the zone of the layer or the zone of the last such layer through which the rays of light, transmitted by the light source means, pass before emerging from the lgihting device by which the light rays always pass through a clean zone of the layer of the last such layer. That layer may be endless and associated with a cleaning means operable to remove dirt from the layer between the time when it leaves the effective light transmitting field of the lighting device and the time when it returns to that field. Alternatively, the layer may comprise a film which passes in front of an illumination window and which is replaced by another film after use.

---

This invention relates to lighting devices and has for its object to provide a lighting device that may exhibit a constant light output when exposed to dirtying conditions, constant light output being important particularly if the lighting device is required for safety or control purposes or if access thereto is difficult.

According to the invention, a lighting device comprises a light source means, one or more light transmitting layers, said light source means being positioned to transmit light through a zone of said layer or layers, and means for continuously changing the zone of said layer or the zone of the last such layer through which the rays of light, transmitted by said light source means, pass before emerging from said lighting device by which the light rays always pass through a clean zone of said layer or said last layer.

The said renewal may be carried out continuously or intermittently at varying speeds or rates depending on the case in question. The light-transmitting layer or last such layer may be endless, in which case it will be associated with a cleaning device which removes dirt therefrom between the time when the layer leaves the effective light transmitting field of the device and the time when it returns to said field.

Alternatively, the light transmitting layer in question may be discontinuous, and be formed by a film which passes in front of an illumination window of the lighting device and which is replaced by another film after use. In such a case, means may be provided to ensure a uniform and non-creasing movement of the film which, if required, can also be used to cover the illumination window.

In order that the invention may be well understood there will now be described some embodiments thereof, given by way of example only, reference being had to the accompanying drawings, in which:

FIG. 1 is a cross-section through a lighting device embodying the invention and having a continuous light-transmitting layer;

FIG. 2 is a diagram showing a different cleaning device for the lighting device of FIG. 1;

FIGS. 3 and 4 are also diagrams showing alternative drive mechanisms for the light-transmitting layer;

FIG. 5 is a cross-section through another embodiment of lighting device utilizing a continuous light-transmitting layer;

FIG. 6 is a longitudinal section along the line VI—VI of FIG. 7 showing a further embodiment of lighting device;

FIG. 7 is an elevation showing the arrangement of lateral tension rollers for the light-transmitting film of the lighting device;

FIG. 8 is a variant of FIG. 6 in partial section, showing lateral tension system in a case in which the cover of the casing containing the light source is formed by the transparent film itself;

FIG. 9 is a section along IX—IX of FIG. 8; and

FIG. 10 is a fragmentary elevation of the lighting device of FIG. 8.

In the embodiment shown in FIG. 1, the lighting device includes a casing 1 secured to a support 2, for example by clamps.

Side walls 3 of the casing carry a fixed frame 4, which may, for example, have a cross-section in the form of an equilateral triangle, to which light sources, e.g. strip lights 5, are secured. A reflector 6 is provided at the rear of these lights and is secured either to the frame or to the side walls 3 by means of lugs 7.

Near each of the side walls 3, the vertices of the frame bear loose rollers 8 on which there is mounted a cylinder 9 of light-transmitting material, e.g. glass or suitable synthetic plastic material. This cylinder forms a protective light-transmitting layer through which the rays of light pass to leave the lighting device.

The effective light-transmitting field of the device is defined by the bottom wall 10 of the casing 1 which is curved until it almost touches the cylinder 9, and a top cover 11 pivotable about a transverse pivot 12 and resting on the side walls 3. The cover is partially cylindrical and its curvature is substantially the same as that of the cylinder 9, to which it is very closely situated when said cover is swung down. If required, a friction seal, which is advantageously flexible, although not shown in the drawing, may form an extension of the bottom wall 10 so as to make an effective seal against the cylinder 9.

The pivot 12 for the cover 11 is situated such that when the cover is opened, access is provided to a compartment 13 bounded by the side walls 3, the cylinder 9 and an oblique rear partition 14, the partition being secured to cross-members 15 in such a way that its bottom edge almost touches the surface of the cylinder.

The compartment 13 is intended to house a cleaning substance 16, for example glass balls, or sawdust soaked in a heavy solvent for the dirt etc.

At the side, the cylinder 9 is secured, for rotation, to a gearwheel 17 meshing with a worm 18 driven at a very slow speed by a small motor 19 combined with a reduction gear.

The lighting device just described operates as follows:

The motor 19 slowly drives the cylinder 9 in the direction of the arrow *f*. Any dirt deposited on the cylinder in cases where the latter is exposed to such dirt, is removed by the cleaning substance 16 so that a clean surface appears in the effective light-transmitting field of the device beyond the edge of the wall 10.

The used cleaning substance drops gradually into the casing 1 from which it can be periodically removed by means of a flap 20. A combined scraper and cross-member 21 protects the motor 19 from any contact with the product.

FIG. 2 shows a variant in which the cleaning system comprises a cross-member 22, for example of felt, one edge of which frictionally bears against the cylinder 9 while the other is immersed in a tank 23 containing a solvent 24.

Referring to FIG. 3, the gearwheel 17 used to drive the cylinder 9 co-operates with a watch escapement mechanism 25 and is combined with a flat drum 26 actuated by a counterweight 27 in known manner.

In the variant shown in FIG. 4, the gear-wheel 17 co-operates with a pawl 27 which is controlled by a small pneumatic jack 28 actuated by a pressure chamber 29 which is subjected to the passage of vehicles on a road 30. The top part of the chamber 29 is deformed locally by the pressure of the vehicle wheels, so that pulses are produced which intermittently rotate the gearwheel in the direction of the arrow $f$. The gearwheel is mounted on a spindle secured to the device casing by means of a freewheel mechanism 31 which prevents it from moving in reverse.

The embodiment shown in FIG. 5 comprises a casing 1 containing cross-members 32 between which a detachable frame 33 can be fitted, said frame bearing the lights 5 and the reflector 6. The frame has a transparent cover or diffuser 34 which in this embodiment is of substantially U-section.

Brackets 35 are provided above the cross-members and carry the spindle 36 of a spool 37 carrying light-transmitting strip material, for example a film 38 of synthetic plastic material. In this case, it is the film 38 which forms the light-transmitting layer.

This film moves in front of the cover 34 and substantially in contact therewith and protects it from dirt. After passing over the cover, it is wound, together with the dirt deposited thereon, on to a takeup spool 39 mounted on brackets 40 and driven at a low speed by a small motor and reduction gear 41.

The motor and reduction gear could be replaced by an equivalent mechanism, for example a clock movement or a pulse-operated remote control of the kind described with reference to FIGS. 3 and 4.

The film 38 covers the window 42 of the cover 43 of the casing 1. The cover 43 is detachable so that the spools of dirty film can be replaced when the supply of clean film has been used up.

In the embodiment shown in FIGS. 6 and 7, the frame 33 bearing the lights 5 and the reflector 6 is detachably secured to the baseplate of the casing 1. Between its walls 33a is disposed a cover formed by a glass 34 which acts as a support for the film 38. The latter unwinds continuously or intermittently from the spool 37 and after passing over the glass is wound on to the take-up spool 39, the latter being mounted on brackets 40 and driven at low speed, for example by a small motor and reduction gear 41 (FIG. 7).

To increase the light-transmitting properties, the film is tensioned at its side edges by rollers 44 which bear on the edges of the side walls 33b of the frame 33 and the axes 44a of which are oblique and converge in the direction of movement of the film as shown in FIG. 7, so that the film 38 is stretched laterally and does not crease. The rollers 44 are mounted in a frame 45 which is pivotally mounted by trunnions 46 in lateral supports 47 and urged towards the frame 33 by springs 48 which provide suitable pressure of the rollers on the film; the pivot 46 enables the joints and rollers to be disengaged when the film is to be changed.

In the variant shown in FIGS. 8 to 10, the film 38 rests on the walls 33a of the frame 33 without the use of a cover. Rollers 44 are provided just as in FIGS. 6 and 7 and for the same purpose.

In this variant, sealing means must be provided at least along the edges of the transverse walls 33a of the frame containing the light source, sealing at the edges of the side walls 33b being provided by the film which is pressed into contact with the rollers 44.

The sealing means may comprise friction elements 49, for example of felt, disposed on each side of the film and mounted in supports 50 and, if required, associated with a pressure device, e.g. a spring strip, to take up any wear.

The lighting device is of particular advantage for visual aids in classes or conferences. The film 38 may be unwound manually or automatically by a suitable device in front of a diffuser, for example ground glass, for the light emitted by the lights 5. This film may be pre-printed or be adapted to receive writing. In the latter case it may be advantageous, for example, to arrange the friction elements 49 in such a way that they erase the film as it unwinds, in which case the film may consist of an endless light-transmitting strip.

Of course modifications can be made to the above described embodiments, more particularly by the substitution of equivalent technical means, without thereby departing from the scope of the invention as defined by the appended claim.

What is claimed is:

1. A lighting device comprising a casing, a light source means mounted therein, at least one light transmitting layer, said light source means being positioned to transmit light through a zone of said at least one layer, and means for continuously moving said at least one layer with respect to said light source means so as to continuously change said zone through which the rays of light transmitted by said light source means pass before emerging from the lighting device, said at least one layer comprising a light-transmitting film, the lighting device further including means defining a window opening, said moving means serving to move said film in front of said window opening, the lighting device still further including means for tensioning said film as it is moved in front of said light source means, said tensioning means comprising rollers in contact with said film so as to maintain said film against said window opening means, the lighting device still further including means for resiliently maintaining said rollers against said window opening means, and said lighting device further including a pivotable frame, and means mounting said rollers in said frame.

References Cited

UNITED STATES PATENTS

| | | | |
|---|---|---|---|
| 479,875 | 8/1892 | Faure | 40—31X |
| 825,195 | 7/1906 | Daniels | 40—31 |
| 2,752,657 | 7/1956 | Meneo | 26—65 |
| 2,800,733 | 7/1957 | Chevillon | 40—31 |
| 3,156,396 | 11/1964 | Snyder et al. | 26—65X |
| 3,426,461 | 2/1969 | Miller | 40—31 |

ROBERT W. MICHELL, Primary Examiner

R. CARTER, Assistant Examiner

U.S. Cl. X.R.

26—65